United States Patent  (10) Patent No.: US 8,635,439 B2
Joshi et al.  (45) Date of Patent: Jan. 21, 2014

(54) PORTABLE LIGHT WEIGHT LDAP DIRECTORY SERVER AND DATABASE

(75) Inventors: Chandrajit G. Joshi, Pune (IN); Romil J. Shah, Pune (IN)

(73) Assignee: International Business Machines Corporation, Armonk, NY (US)

(*) Notice: Subject to any disclaimer, the term of this patent is extended or adjusted under 35 U.S.C. 154(b) by 647 days.

(21) Appl. No.: 12/495,339

(22) Filed: Jun. 30, 2009

(65) Prior Publication Data

US 2010/0332814 A1  Dec. 30, 2010

(51) Int. Cl.
*G06F 9/00* (2006.01)
*G06F 15/177* (2006.01)

(52) U.S. Cl.
USPC ............................................. 713/2

(58) Field of Classification Search
USPC ...................................... 713/1, 2
See application file for complete search history.

(56) References Cited

U.S. PATENT DOCUMENTS

| | | | |
|---|---|---|---|
| 6,438,550 B1* | 8/2002 | Doyle et al. | 726/2 |
| 6,714,930 B1 | 3/2004 | Garrison et al. | |
| 7,051,114 B1 | 5/2006 | Ravishankar | |
| 7,617,257 B2 | 11/2009 | Sathyanarayan | |
| 7,954,144 B1 | 5/2011 | Ebrahimi | |
| 2002/0082821 A1 | 6/2002 | Ferguson | |
| 2002/0087718 A1 | 7/2002 | Hill | |
| 2002/0116648 A1* | 8/2002 | Tran | 713/202 |
| 2003/0191868 A1* | 10/2003 | Espino | 709/328 |
| 2004/0117350 A1 | 6/2004 | Cavage et al. | |
| 2004/0221163 A1* | 11/2004 | Jorgensen et al. | 713/182 |
| 2005/0160133 A1 | 7/2005 | Greenlee | |
| 2006/0020586 A1 | 1/2006 | Prompt et al. | |
| 2006/0026556 A1* | 2/2006 | Nishimura | 717/104 |
| 2006/0179150 A1 | 8/2006 | Farley | |
| 2007/0214209 A1 | 9/2007 | Maeda | |
| 2007/0216960 A1* | 9/2007 | Ohtani | 358/407 |
| 2008/0010675 A1* | 1/2008 | Massascusa et al. | 726/9 |
| 2008/0040395 A1* | 2/2008 | Danoyan | 707/200 |
| 2008/0040550 A1 | 2/2008 | Lindner | |
| 2008/0098460 A1* | 4/2008 | Jain | 726/4 |
| 2009/0265467 A1 | 10/2009 | Peles | |
| 2010/0010973 A1* | 1/2010 | Harrington | 707/4 |

OTHER PUBLICATIONS

Title: "IBM Directory Server (LDAP)" (author unknown); Version 5, Release 3, chapter 4, pp. 14-15 ("Suffix (naming context)"); Aug. 2005.

* cited by examiner

*Primary Examiner* — Mohammed Rehman
(74) *Attorney, Agent, or Firm* — Brevetto Law Group

(57) ABSTRACT

A lightweight embedded directory server with portable LDAP data is disclosed. The directory server and database comprises a processing chip, an on-chip processing unit, an on-chip memory system, and an on chip input/output system. The memory system stores an embedded operating system and an embedded directory server, and is also used for storing data to be processed by the processing unit. The input/output system is provided for connecting the processor chip to one or more applications for supplying directory services to the one or more applications. A portable memory device stores a directory database, and, in use, this memory device is releasably connected to the on chip input/output system. An on-chip driver is used to perform read and write operations on the portable memory device; and a boot loader software program is used for starting execution of the embedded directory service.

20 Claims, 4 Drawing Sheets

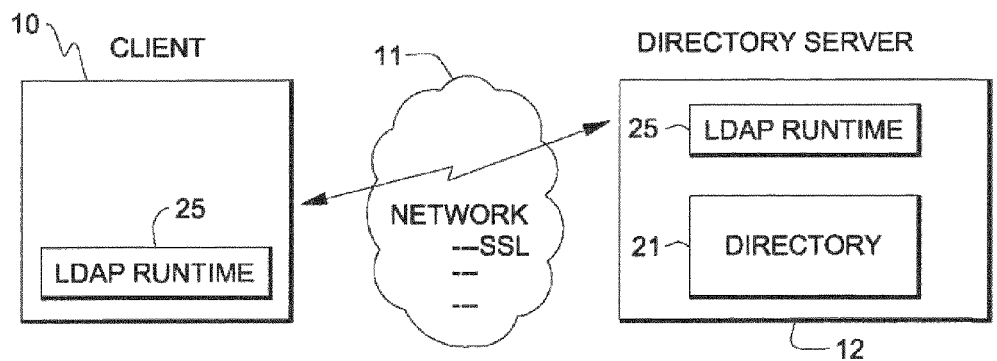
FIG. 1
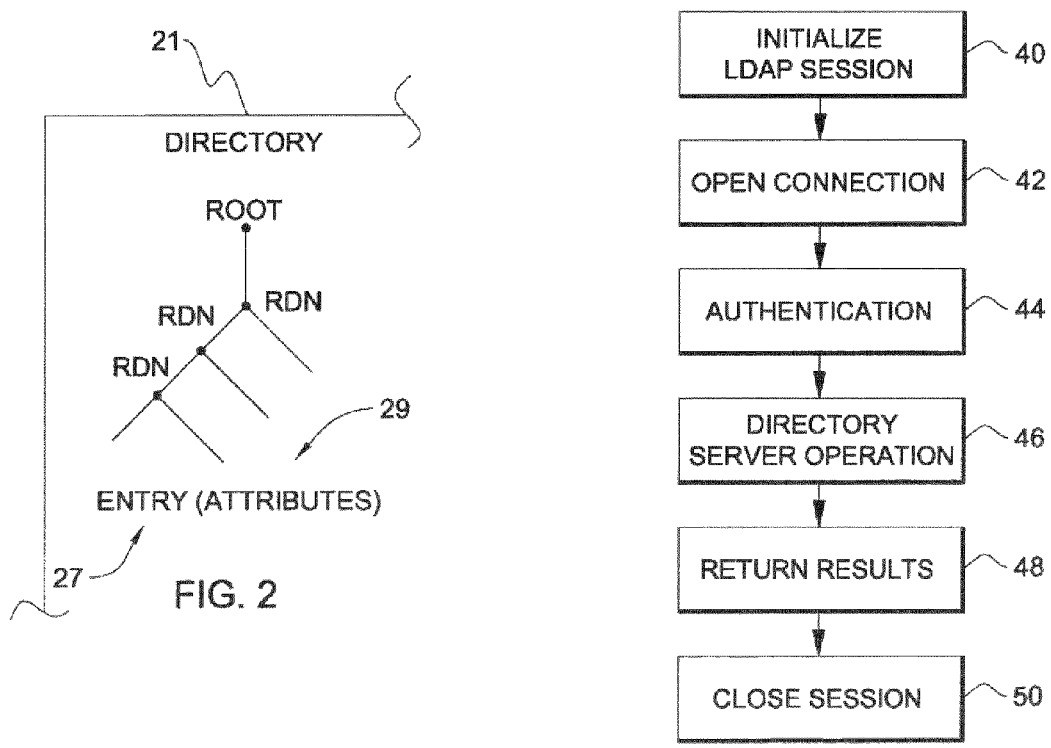
FIG. 2
FIG. 3

PORTABLE LIGHT WEIGHT LDAP DIRECTORY SERVER AND DATABASE

FIELD OF DISCLOSURE

This disclosure generally relates to Lightweight Directory Access Protocol (LDAP) Servers and databases, and more specifically, to a portable LDAP server and database.

TRADEMARKS

IBM® is a registered trademark of International Business Machines Corporation, Armonk, N.Y., U.S.A. Other names used herein may be registered trademarks, trademarks or product names of International Business Machines Corporation or other companies. TIVOLI® are registered trademarks of IBM Corporation. Microsoft® is a registered trademark of Microsoft Corporation. Java® is a registered trademark of Sun Microsystems, U.S.A.

BACKGROUND

Lightweight Directory Access Protocol (LDAP) is an industry-standard software protocol that enables a user to locate organizations, individuals, as well as other resources such as files and devices, for example, within a network. The network may be the Internet, for example, or on a smaller scale, the network may be a corporate intranet. LDAP is essentially a "lightweight" version of Directory Access Protocol (DAP), which is part of X.500, a standard for directory services in a network. An advantage of LDAP is that it runs directly over Transmission Control Protocol/Internet Protocol (TCP/IP) and provides most of the functionality of DAP, however, at a much lower cost.

A directory provides information as to the location of a particular thing within the network. For example, on TCP/IP networks, which include the Internet, the Domain Name System (DNS) is the directory system used to relate the domain name to a specific network address, for example, a unique location in the network. LDAP allows a user to search for an individual, for example, without knowing the domain name or where that individual may be located within the network.

An LDAP directory is typically organized in a hierarchical tree-like structure that reflects political, geographical and/or organizational boundaries. For example, the directory may include countries at the top of the tree. These countries may then branch out into organizations, which may extend to organizational units, such as divisions, departments, etc., and then to individuals, such as people, files, documents and shared resources such as printers.

The Lightweight Directory Access Protocol (LDAP) has emerged as an IETF open standard to provide directory services to applications ranging from e-mail systems to distributed system management tools. LDAP is an evolving protocol that is based on a client-server model in which a client makes a TCP/IP connection to an LDAP server, sends requests, and receives responses. The LDAP information model in particular is based on an "entry," which contains information about some object. Entries are typically organized in a specified tree structure, and each entry is composed of attributes.

LDAP provides a number of known functions including query for example search and compare, update, authentication etc. The search and compare operations are used to retrieve information from the database. For the search function, the criteria of the search are specified in a search filter. The search filter typically is a Boolean expression that consists of qualifiers including attribute name, attribute value and Boolean operators like AND, OR and NOT. Users can use the filter to perform complex search operations. For example, one type of filter syntax is defined in RFC 2254.

LDAP thus provides the capability for directory information to be efficiently queried or updated. It offers a rich set of searching capabilities with which users can put together complex queries to get desired information from a backing store. Increasingly, it has become desirable to use a relational database for storing LDAP directory data. Representative database implementations include DB/2, Oracle, Sybase, Informix and the like. As is well known, Structured Query Language (SQL) is the standard language used to access such databases.

LDAP directory server is a light weight directory server used to provide authentication, authorization and identity management and many other robust features to the end user. Directory server available in the field comes with a database used to store user data, and overall the directory server solution provided to the customer is heavy due to several modules attached to it, such as replication, proxy, remote authentication, etc.

SUMMARY

As the inventors herein have recognized, with customer data getting more sensitive and critical and the hardware recourses getting more compact in size, there comes the need to have a compact directory server embedded in a device and with access to the sensitive customer data stored in portable databases via an embedded directory server.

Embodiments of the invention provide a lightweight embedded directory server with portable LDAP data. The directory server and database comprises a processing chip, an on-chip processing unit, an on-chip memory system, and an on chip input/output system. The on-chip memory system stores an embedded operating system and an embedded directory server, and is also used for storing data to be processed by the processing unit. The on-chip input/output system is provided for connecting the processor chip to one or more applications for supplying directory services to the one or more applications.

A portable memory device stores a directory database, and, in use, this memory device is releasably connected to the on chip input/output system. An on-chip driver is used by the embedded directory server to perform read and write operations on the portable memory device; and a boot loader software program, stored on the on-chip memory system, is used for starting execution of the embedded directory service.

In a further aspect, embodiments of the invention provide a method and a computer program product for operating a lightweight embedded directory server with portable LDAP data. The directory server and database comprises a processing chip, an on-chip processing unit, an on-chip memory system storing an embedded operating system and an embedded directory server, an on-chip input/output system for connecting the processor chip to one or more applications for supplying directory services to the one or more applications, and a portable memory device for storing directory database.

The directory server and database further comprises an on-chip driver, and a boot loader software program stored in the on-chip memory system for starting execution of the embedded directory service. In this embodiment, the method comprises releasably connecting the portable memory device to the processing chip, the portable memory device storing the directory database; the boot loader initiating operation of the embedded directory server; and the driver performing read and write operations on the portable memory device.

Embodiments of the invention provide a number of important features. For example, embodiments of the invention provide portable embedded light weight directory server stored in memory such as EEPROM, SRAM or any other storage memory solution available, and an embedded light weight directory server, referred to as a directory server, reduced in functionality so as to reduce the footprint of the directory server so as to fit the server in the embedded device. Embodiments of the invention also provide embedded LDAP aware plug-in to perform read/write operation on the storage device having portable file based backend on it, and an embedded LDAP KIT with support of wireless LDAP client support.

Embodiments of the invention provide several significant advantages. For instance, the provision of a lightweight embedded directory server in the portable device makes the directory server easy to carry and deploy in the embedded environment. Embodiments of the invention also provide connection to portable database stored in the embedded device. This provides a customer with the flexibility to carry portable database and hook it as and when required, to access user information via directory server running on the embedded device.

BRIEF DESCRIPTION OF THE DRAWINGS

FIG. 1 is a representative LDAP directory server implementation.

FIG. 2 is a simplified example of an LDAP directory.

FIG. 3 is a flowchart of an LDAP directory session in an accordance with an embodiment of the invention.

DETAILED DESCRIPTION

Figure 4:
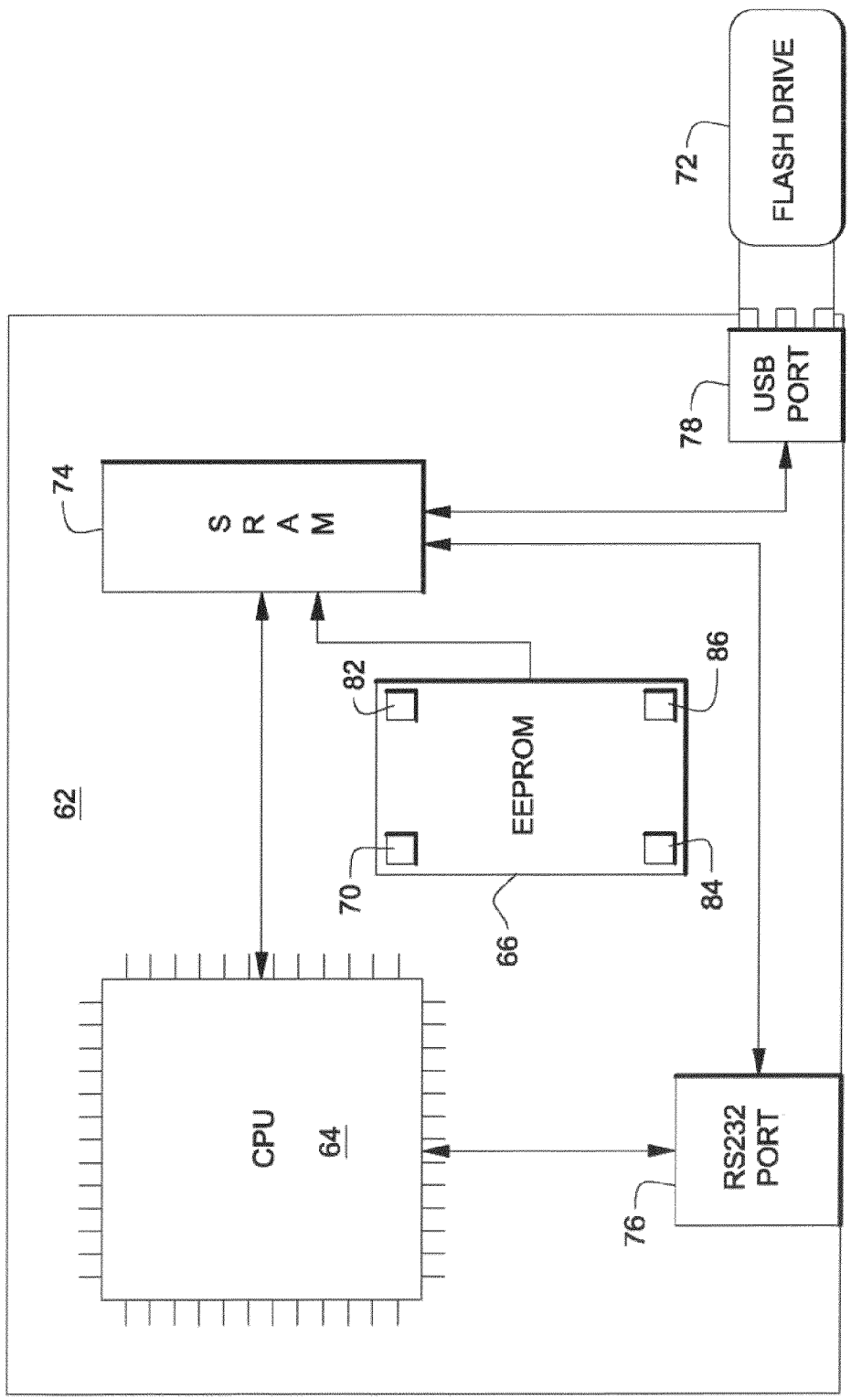
FIG. 4 depicts a portable LDAP directory server and database in accordance with an embodiment of the invention.

As will be appreciated by one skilled in the art, embodiments of the present invention may be implemented as a system, method or computer program product. Accordingly, embodiments of the invention may take the form of an entirely hardware embodiment, an entirely software embodiment, including firmware, resident software, micro-code, etc., or an embodiment combining software and hardware aspects that may all generally be referred to herein as a "circuit," "module" or "system." Furthermore, embodiments of the invention may take the form of a computer program product implemented in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer, for example, through the Internet using an Internet Service Provider.

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A block diagram of a conventional LDAP directory service is shown in FIG. 1. As is well-known, LDAP is the lightweight directory access protocol, and this protocol has been implemented in the prior art, e.g., as either a front end to the X.500 directory service, or as a standalone directory service. According to the protocol, a client machine 10 makes a TCP/IP connection to an LDAP server 12, sends requests and receives responses. LDAP server 12 supports a directory 21 as illustrated in a simplified form in FIG. 2.

Each of the client and server machines further include a directory runtime component 25 for implementing the directory service operations. The directory 21 is based on the concept of an "entry" 27, which contains information about some object (e.g., a person). Entries are composed of attributes 29, which have a type and one or more values. Each attribute 29 has a particular syntax that determines what kinds of values are allowed in the attribute (e.g., ASCII characters, .jpeg file, etc.) and how these values are constrained during a particular directory operation. Entries are stored in a given table (e.g., ldap_entry) that includes entry IDs, parent IDs, a create and last modified timestamp, together with the complete entry in string format. Each attribute has an associated attribute table.

The directory tree is organized in a predetermined manner, with each entry uniquely named relative to its sibling entries by a "relative distinguished name" (RDN). An RDN comprises at least one distinguished attribute value from the entry and, at most, one value from each attribute is used in the RDN. According to the protocol, a globally unique name for an entry, referred to as a "distinguished name" (DN), comprises a concatenation of the RDN sequence from a given entry to the tree root.

The LDAP search can be applied to a single entry (a base level search), an entry's children (a one level search), or an entire subtree (a subtree search). Thus, the scope supported by LDAP search is: base, one level and subtree. LDAP does not support search for arbitrary tree levels and path enumeration.

LDAP includes an application programming interface (API). An application on a given client machine uses the LDAP API to effect a directory service "session" according to the flowchart of FIG. 3. At step 40, an LDAP session with a default LDAP server is initialized. At step 42, an API function ldap_init( ) returns a handle to the client, and this handle may allow multiple connections to be open at one time. At step 44, the client authenticates to the LDAP server using, for example, an API ldap_bind( ) function. At step 46, one or more LDAP operations are performed. For example, the API function ldap_search( ) may be used to perform a given directory search. At step 48, the LDAP server returns the results of the directory search, e.g., one or more database elements that meet the search criteria. The session is then closed at step 50 with the API ldap_unbind( ) function then being used to close the connection.

As mentioned above, LDAP directory server available in the field comes with a database used to store user data, and overall the directory server solution provided to the customer is heavy due to several modules attached to it such as replication, proxy, remote authentication, etc. With customer data getting more sensitive and critical and the hardware resources getting more compact in size, there comes the need to have a compact directory server embedded in a device and with access to the sensitive customer data stored in portable databases via an embedded directory server.

Embodiments of the invention effectively address this issue. Generally, this is done by providing a lightweight embedded directory server with portable LDAP data. This directory server is referred to herein as "Embedded LDAP kit."

Definitions are Given for the Following Terms, which are Used in the Discussion Below.

EOS: Embedded operating system which can be loaded in any embedded device. It is assumed that all features required to support execution of multi-threaded application are available in this operating system.

EDS: Embedded directory server to be loaded in the embedded kit.

Boot Loader: A piece of software used to load EOS and EDS into the SRAM and starts its execution.

The following discussion describes the support of EDS running on an embedded kit supporting EOS.

FIG. 4 depicts an embodiment of an embedded system kit that can be used to support EDS. Generally, this embodiment comprises chip or chip substrate 62, CPU 64, EEPROM 66, FS_PLUGIN 70, FLASH DRIVE 72, SRAM 74, RS232 PORT 76, and USB Port 78.

Component Description

EEPROM: A non-volatile chip used to store data. In the embodiment of FIG. 4, the EEPROM stores the boot loader 82, the EOS 84, the EDS 86 and a plug-in "FS_PLUGIN" 70 used to perform read and write operation on flash drive.

FS_PLUGIN: A driver used by the EDS to perform LDAP read and write operations on the file based database backend available on the FLASH drive.

FLASH DRIVE: A USB device used to store the file based database backend. For example, LDBM is one such light weight file based back end, which can be stored in the flash drive. The embodiment of FIG. 4 shows a FLASH. However, it can be any other storage device that can be connected to EDS over a USB port.

SRAM: A physical memory used to store the data to be processed by the CPU. EOS is loaded in physical memory and keeps running till the kit is powered.

RS232 Port: Network port to hook different external network applications. LDAP clients will connect to the EDS via this network port. The embodiment of FIG. 4 shows an RS232 port. However, it can be any other network device as well, like a USB port.

USB Port: Used to hook USB devices. USB based FLASH drive is hooked into the USB port where by allowing the FS_PLUGIN to load the file based back end available on the storage device into the physical memory SRAM.

Figure 5:
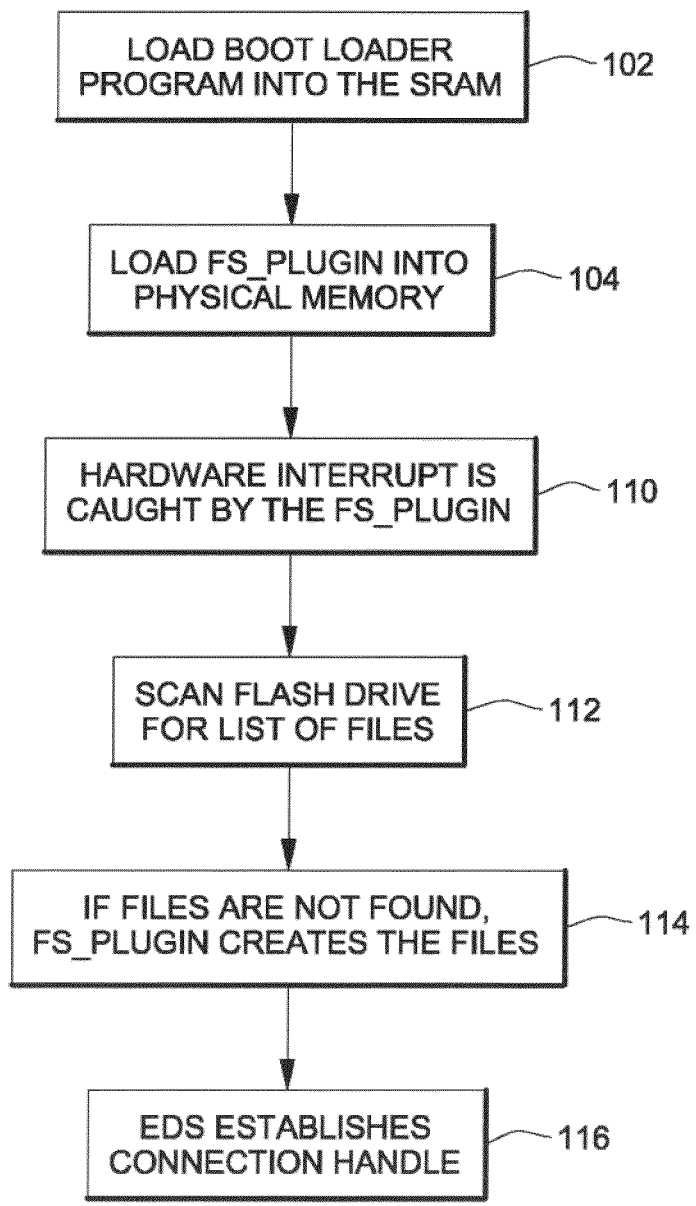
FIG. 5 illustrates the control flow of the embedded directory server of FIG. 4 on start-up in accordance with an embodiment of the invention.
Figure 6:
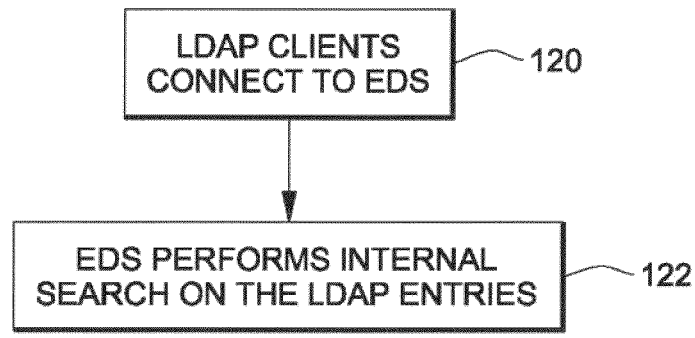
FIG. 6 shows the control flow of LDAP search operations using the embedded directory server of FIG. 4 in accordance with an embodiment of the invention.
Figure 7:
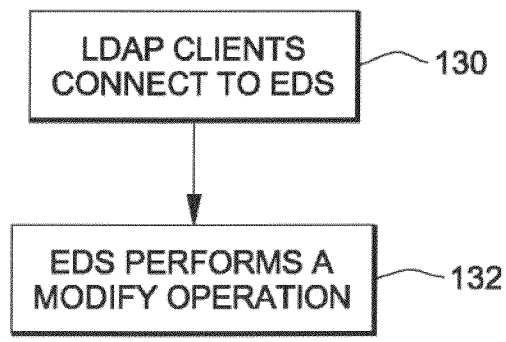
FIG. 7 shows the control flow of an LDAP client update operation using the embedded directory server of FIG. 4 in accordance with an embodiment of the invention.

FIGS. 5, 6 and 7 shows respectively, the control flow of embedded directory server on startup, the control flow of LDAP search operations, and the control flow of a client update operations. Each of these control flows is discussed below.

Control Flow of Embedded Directory Server on Startup

With reference to FIG. 5, discussed below are the series of steps to be followed to deploy and start EDS. In this embodiment, the EDS, EOS and FS_PLUGIN are burnt on EEPROM.

In this embodiment, an EEPROM is assumed. However, EDS, EOS and FS_PLUGIN can be stored on any other static memory available. At step 102, on powering-on the embedded kit shown in FIG. 4, the boot loader program is loaded into the SRAM, the CPU executes the boot loader that has required instructions to load EOS and EDS into the SRAM and start their execution. At step 104, EDS on startup loads FS_PLUGIN from EEPROM into the physical memory. FS_PLUGIN is a LDAP aware interrupt driven driver used to perform read and write operations on the USB devices hooked with the embedded kit. At step 110, on connecting the FLASH drive containing the file based backend to the embedded kit, the hardware interrupt generated by the FLASH drive is caught by the FS_PLUGIN.

At step 112, FS_PLUGIN scans FLASH drive for the list of files constituting the file based back end and loads all the files if available into the physical memory SRAM. At step 114, if FS_PLUGIN fails to find file based backend, it creates the file based backend on the USB device and loads the same into the physical memory. At step 116, EDS establishes connection handle with the file backend loaded in the memory to perform all LDAP operations on it.

Control Flow of LDAP Search Operations

With reference to FIG. 6, at step 120, LDAP clients connect to EDS running on the embedded kit via RS232 via 389 (or any other configurable) port. At step 122, EDS, on receiving LDAP client search request, performs internal search on the LDAP entries stored in the memory (SRAM). If the requested entries are available, those are returned as search results.

Control Flow of LDAP Client Update Operation

With reference to FIG. 7, at step 130, LDAP client connects to EDS running on the embedded kit via RS232 via 389 port. At step 122, EDS, on receiving LDAP client modify operation, performs a modify operation on the entry if present in the in-memory file based back end. It also flushes the modified entries to the FLASH memory so that the entries in SRAM and those stored on the drive are in synchronization.

While it is apparent that the invention herein disclosed is well calculated to fulfill the objects discussed above, it will be appreciated that numerous modifications and embodiments may be devised by those skilled in the art, and it is intended that the appended claims cover all such modifications and embodiments as fall within the true scope of the present invention.

The description set out above describe particular embodiments only and is not intended to limit the invention, whose scope is determined solely by the claims set out below. As used here, singular forms "a", "an" and "the" are intended to include plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

What is claimed is:

1. A method of operating an embedded directory server and an embedded directory database, the method comprising:
providing a processing unit on a substrate, wherein the embedded directory server and the embedded database are included on said substrate with the processing unit;
providing an input/output unit on said substrate;
releasably coupling a portable memory device to said substrate via the input/output unit, wherein the portable memory device is configured to store a portable directory database;
initiating operation of the embedded directory server; and
performing read and write operations on the portable memory device to retrieve data from said portable directory database.

2. The method as claimed in claim 1, wherein said substrate includes an on-chip memory configured to store an embedded operating system and said embedded directory server;
wherein the input/output system is configured to couple the processor chip to one or more applications for supplying directory services to the one or more applications, an on-chip driver, and a boot loader software program stored in the on-chip memory system for starting execution of the embedded directory service; and
wherein the portable memory device is releasably coupled to the substrate using either a USB port or an RS232 port.

3. The method as claimed in claim 2, wherein the boot loader program initiates operation of the embedded directory server.

4. The method as claimed in claim 2, wherein the driver is configured to perform read and write operations on the portable memory device.

5. The method as claimed in claim 2, wherein the on-chip memory system includes a first, non-volatile memory unit storing the boot loader program, the embedded operating system, and the embedded directory server, and a second memory unit for storing data to be processed by the processing unit, and wherein the method further comprises:
loading the embedded operating system via the boot loader program and the embedded directory server into the second memory unit.

6. The method according to claim 5, further comprising the embedded directory server loading the on-chip driver from the first memory unit onto the second memory unit.

7. The method as claimed in claim 6, wherein the driver performing read and write operations includes the driver loading files from the portable memory device into the second memory unit.

8. The method as claimed in claim 2, wherein the coupling of the portable memory device to the substrate includes the portable memory device generating an interrupt signal in response to the portable memory device being coupled to the processing unit, and wherein the method further comprises:
loading files from the portable memory device in response to receiving the interrupt signal generated by the portable memory device, wherein in response to receiving the interrupt signal, the driver loads data in the files stored on portable memory device into a second memory unit, the data stored in the portable directory database comprising sensitive customer data including customer authentication data.

9. A directory server and database comprising:
an on-chip processing unit mounted on a chip;
an on-chip memory system storing an embedded operating system and an embedded directory server, and for storing data to be processed by the processing unit;
an on-chip input/output system mounted on said chip for coupling the processing unit to one or more applications for supplying directory services to the one or more applications; and
a portable memory device storing a portable directory database and for releasably coupling to the on-chip input/output system;
wherein an on-chip driver is used by the embedded directory server to perform read and write operations on the portable memory device; and
wherein a boot loader software program is stored on the on-chip memory system for starting execution of the embedded directory service.

10. The directory server and database as claimed in claim 9, wherein the on-chip memory system includes a first, non-volatile memory unit storing the embedded operating system and the embedded directory server; and
a second memory unit for storing the data to be processed by the processing unit.

11. The directory server and database as claimed in claim 10, wherein the boot loader loads the embedded operating system and the embedded directory server onto the second memory unit and starts execution of the embedded operating system and the embedded directory server.

12. The directory server and database as claimed in claim 11, wherein the on chip driver loads files from the portable memory device into the second memory unit.

13. The directory server and database as claimed in claim 12, wherein the portable memory device generates an interrupt signal in response to being coupled to the processing unit;
   wherein the on-chip driver receives the interrupt signal, and in response to receiving the interrupt signal, the on-chip driver loads files from the portable memory device into the second memory unit, the files comprising sensitive customer data including customer authentication data; and
   wherein the portable memory device is releasably coupled to the to the on-chip input/output system using either a USB port or an RS232 port.

14. The directory server and database as claimed in claim 11, wherein the first memory unit is configured to store the boot loader program.

15. The directory server and database as claimed in claim 9, wherein the input/output system includes a first port for releasably coupling the portable memory device to the processing unit; and
   a second port for coupling the processing unit to the one or more applications.

16. The directory server and database as claimed in claim 9, wherein the portable directory database includes data; and
   wherein the on-chip processing unit, the on-chip memory system and the on-chip input/output system are configured on a same substrate.

17. An article of manufacture comprising:
   at least one non-transitory computer usable medium having computer readable program code logic to execute a machine instruction in one or more processing units for operating a directory server and database, wherein the directory server and database include a processing chip:
   an on-chip processing unit;
   an on-chip memory system storing an embedded operating system and an embedded directory server;
   an on-chip input/output system for coupling the processor chip to one or more applications for supplying directory services to the one or more applications;
   an on-chip driver; a boot loader software program stored in the on-chip memory system for starting execution of the embedded directory service; and
   a portable memory device storing a portable directory database and releasably coupled to the processing chip;
   wherein the on-chip processing unit, the on-chip memory system and the on-chip input/output system are configured on a same substrate; and
   wherein the computer readable program code logic, in response to being executed, performs the following:
   the boot loader initiating operation of the embedded directory server; and
   the driver performing read and write operations on the portable memory device.

18. The article of manufacture as claimed in claim 17, wherein the on-chip memory system includes:
   a first, non-volatile memory unit storing the boot loader program, the embedded operating system, and the embedded directory server; and
   a second memory unit for storing data to be processed by the processing unit; and
   wherein the computer readable program code logic, in response to being executed, further performs:
   causing the boot loader to load the embedded operating system and the embedded server into the second memory unit; and
   causing the embedded directory server to load the on-chip driver from the first memory unit onto the second memory unit; and wherein:
   the driver performing read and write operations includes the driver loading data in the files stored on portable memory device into the second memory unit.

19. The article of manufacture as claimed in claim 17, wherein the portable memory device generates an interrupt signal in response to the portable memory device being coupled to the processor chip;
   wherein the driver loading files from the portable memory device includes the driver receiving the interrupt signal, and in response to receiving the interrupt signal, the driver loading the data in the files stored on portable memory device into the second memory unit, the data in the files comprising sensitive customer data including customer authentication data; and
   wherein the portable memory device is releasably coupled to the processing chip using either a USB port or an RS232 port.

20. The article of manufacture as claimed in claim 17, wherein the embedded directory server receives search requests and modify operations from clients, and the computer readable program code logic, in response to being executed, further performs:
   causing the embedded directory server, on receiving the search requests, to perform an internal search on directory access entries stored in the memory system; and
   causing the embedded directory server, on receiving the modify operations, to perform a modify operation to modify entries stored in the memory system.

* * * * *